No. 709,762. Patented Sept. 23, 1902.
J. F. GREAVES.
COUPLING FOR CONDUIT RODS.
(Application filed Apr. 7, 1902.)
(No Model.)
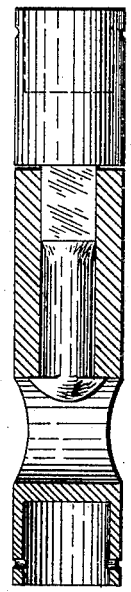
Fig. 5.
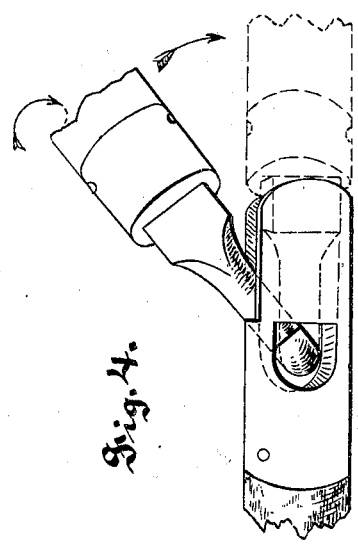
Fig. 4.
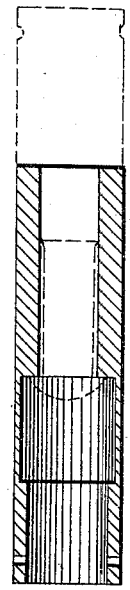
Fig. 7.
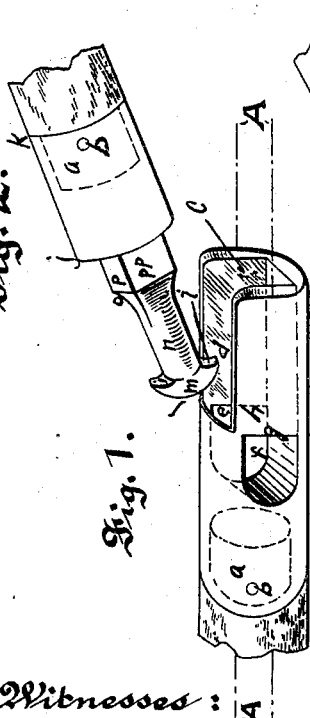
Fig. 1.
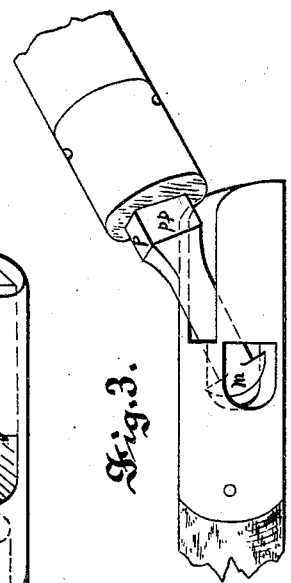
Fig. 3.
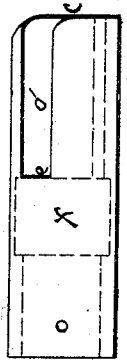
Fig. 6.
Fig. 2.
Witnesses:
Fred W. Duenckel.
W. S. Campbell
Inventor:
John F. Greaves

UNITED STATES PATENT OFFICE.

JOHN FRANCIS GREAVES, OF ST. LOUIS, MISSOURI.

COUPLING FOR CONDUIT-RODS.

SPECIFICATION forming part of Letters Patent No. 709,762, dated September 23, 1902.

Application filed April 7, 1902. Serial No. 101,699. (No model.)

*To all whom it may concern:*

Be it known that I, JOHN FRANCIS GREAVES, a citizen of the United States, residing at St. Louis, in the State of Missouri, have invented a new and useful Coupling, of which the following is a specification.

My invention relates to improvements in a coupling for rods used in threading underground ducts in conduits with wire preparatory to drawing into and through the duct a cable; and the objects of my improvement are, first, to give a coupling for rods which can be easily and quickly adjusted; second, to afford a coupling for the rods which cannot become uncoupled while in the duct; third, to give strength to the coupling; fourth, to give a coupling for rods which can be made at any angle desired, and, fifth, to give a coupling without any projections or parts to catch on rough or uneven surfaces of the duct. I attain these objects by the mechanism illustrated in the accompanying drawings, in which—

Figure 1 is one part of the coupling in position to receive the other part. Fig. 2 is the other part of the coupling held at an angle of about thirty degrees ready to be inserted into Fig. 1. Fig. 3 represents the two parts of the coupling, showing position after Fig. 2 has been placed in the first position. Fig. 4 represents the two parts, first, in position after Fig. 2 has been turned one-fourth way around, and, second, the dotted lines showing coupling after part 2 has been brought into final position. Fig. 5 is a sectional view showing coupling in position. Fig. 6 is the same as Fig. 1, except in Fig. 6 that part shows opening passing through at right angles closed at sides. Fig. 7 is a sectional view showing the coupling with opening closed, as in Fig. 6.

The coupling consists of two parts or pieces, and hereinafter I will refer to the part illustrated by Fig. 1 as "part" 1 and the part illustrated by Fig. 2 as "part" 2.

The two parts of the coupling are made of malleable iron, and the main parts or body are made round the same size of the wooden rods used. One end of each part has a round cavity $a$, into which the end of the wooden rod used is fastened, and when fitted into the cavity $a$ the coupling is held firmly in place on the end of the rod by means of a bolt passing through the hole $b$ in each side of the coupling and through the rod. Part 1, as shown in Fig. 1, has a rectangular opening in the end which forms the coupling, being in the shape of a rectangular box open at the end at $c$ and top $d$, and connects at the other end at $e$ with an opening $f$, passing through at right angles from side to side of part 1 of the coupling. The opening $f$ may be made, as shown at Fig. 6, so as not to pass entirely through part 1, but consists of a closed cavity on all sides with opening into rectangular box $d$ and $c$ at $e$. Part 2 has also a cavity $a$ for fastening onto wooden rod, as before described. The main part from $j$ to $k$ is round and the same size as wooden rod used. On the end of this part, which fits into the opening in part 1, is a convex head $l$, flattened on each side $m$ to same width as round part $n$. The round part $n$ from the shoulder $i$ to the beginning of the rectangular shoulder $o$ is a little smaller than the rectangular opening in part 1, $d$ and $c$, into which it fits. This round part $n$ terminates with a rectangular shoulder $o$, as shown, of which the rectangular face $p$ is a little wider than the rectangular face $p\,p$. The face $p\,p$ is the same width as the rectangular opening $d$ and $c$, and when the coupling is made by bringing part 2 into final position fits securely in the rectangular box at $c$. Face $p$ is made wider than the rectangular opening $d$ and $c$ to prevent part 2 from being brought down into position before part 2 is turned and the coupling is made.

The coupling is made by inserting the head $m$ on part 2 into the rectangular opening $d$ and passing through the opening $e$ into the cavity $f$, while part 2 is held at an angle, as shown in Fig. 3. When the head $m$ on part 2 has passed into the cavity $f$, then part 2 must be turned one-fourth way around either to the right or left. Part 2 is then brought down into final position, as shown by second part of Fig. 4, and the coupling is made. When part 2 has been placed in position, as shown in Fig. 3, it cannot be brought down into final position until the turn of one-fourth way around has been made, because face $p$ on the rectangular shoulder is wider than the rectangular box-opening $d$ and $c$ and will not come down into position until the turn has been made, which brings the projecting parts of the convex head $i$ and $i$ in contact with the shoulders $g$ and $h$ and forms the fastening. The cavity $f$, as shown in Figs. 1 and 6, is wider at the sides or points $g$ and $h$ than the rectangular box $d$ and $c$, thus forming a shoulder on each side of the box at $g$ and $h$, against which the projecting parts $i$ and $i$ of the head $m$ fit firmly after the head has been turned and form the fastening of the coupling, so that when the two parts are brought into position they cannot be pulled apart. When the parts are brought into final position, as shown in sectional views, Figs. 5 and 7, there are no projections on the coupling to catch upon any rough surface or obstruction that may be in the duct.

What I claim, and desire to secure by Letters Patent of the United States, is—

1. A coupling consisting of two parts as described, one with rectangular opening in end and along the side as shown, connecting with circular cavity in the part, which cavity is wider than the rectangular opening connecting with it, forming shoulders on each side of the cavity, and the other part, having round part $n$ with convex head flattened on sides, as described with projecting points on the two sides adapted to engage the shoulders formed by the cavity at the end of the rectangular opening, in the other part when inserted into the cavity of the other part, through the rectangular opening, substantially as specified.

2. A coupling consisting of two parts as described, one with round part $n$ and rectangular part $o$ having rectangular faces $p$ and $p\,p$ for the purposes specified which fit into the opening in the other part, which opening is in the form of a rectangular box open at the end of the part at $c$ and open along the top at $d$ and opening at $e$ into the closed cavity which cavity is wider than the rectangular box thereby forming shoulders, which engage the projecting points on the two sides of the convex head on round part $n$ as described when the rectangular part $o$ is brought down into position so that one of the faces $p\,p$ rests on the bottom of the rectangular box and the faces $p$ rest against either side of the rectangular box and fit securely into the rectangular box, substantially as described.

In testimony whereof I have signed my name to this specification, in the presence of two subscribing witnesses, this 2d day of April, 1902.

JOHN FRANCIS GREAVES.

Witnesses:
WILSON A. TAYLOR,
W. S. CAMPBELL.